(12) United States Patent
Kim et al.

(10) Patent No.: US 11,705,128 B2
(45) Date of Patent: *Jul. 18, 2023

(54) OPERATION METHOD OF DIALOG AGENT AND APPARATUS THEREOF

(71) Applicant: SAMSUNG ELECTRONICS CO., LTD., Suwon-si (KR)

(72) Inventors: Young-Seok Kim, Suwon-si (KR); Jeong-Hoon Park, Seoul (KR); Seongmin Ok, Yongin-si (KR); Je Hun Jeon, Suwon-si (KR); Jun Hwi Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

This patent is subject to a terminal disclaimer.

(21) Appl. No.: 17/346,626

(22) Filed: Jun. 14, 2021

(65) Prior Publication Data

US 2021/0304762 A1  Sep. 30, 2021

Related U.S. Application Data

(63) Continuation of application No. 16/356,071, filed on Mar. 18, 2019, now Pat. No. 11,056,110.

(30) Foreign Application Priority Data

Aug. 28, 2018 (KR) .......................... 10-2018-0101285

(51) Int. Cl.
*G10L 15/22* (2006.01)
*G06N 3/08* (2023.01)
(Continued)

(52) U.S. Cl.
CPC ................ *G10L 15/22* (2013.01); *G06N 3/08* (2013.01); *H04M 3/4936* (2013.01); *G06Q 10/02* (2013.01)

(58) Field of Classification Search
USPC ........ 704/231, 246, 247, 251, 252, 270–271
See application file for complete search history.

(56) References Cited

U.S. PATENT DOCUMENTS

| 6,931,384 B1 | 8/2005 | Horvitz et al. |
| 7,444,383 B2 | 10/2008 | Horvitz |

(Continued)

FOREIGN PATENT DOCUMENTS

| KR | 10-2014-0023080 A | 2/2014 |
| KR | 10-2017-0084551 A | 7/2017 |

(Continued)

OTHER PUBLICATIONS

Extended European Search Report dated Nov. 13, 2019 in corresponding European Patent Application No. 19172307.1 (11 pages in English).

*Primary Examiner* — Leonard Saint-Cyr
(74) *Attorney, Agent, or Firm* — NSIP Law

(57) ABSTRACT

An operation method of a dialog agent includes obtaining an utterance history including at least one of an outgoing utterance to be transmitted to request a service or at least one of an incoming utterance to be received to request the service, updating a requirement specification including items requested for the service based on the utterance history, generating utterance information to be used to request the service based on the updated requirement specification, and outputting the generated utterance information.

20 Claims, 13 Drawing Sheets

(51) Int. Cl.
*H04M 3/493* (2006.01)
*G06Q 10/02* (2012.01)

(56) References Cited

U.S. PATENT DOCUMENTS

| | | |
|---|---|---|
| 7,580,908 B1 | 8/2009 | Horvitz et al. |
| 7,751,542 B2 | 7/2010 | Klemm et al. |
| 7,844,666 B2 | 11/2010 | Horvitz et al. |
| 8,139,722 B2 | 3/2012 | Das et al. |
| 8,392,341 B2 | 3/2013 | Lee |
| 8,521,538 B2 | 8/2013 | Laughery et al. |
| 8,964,962 B1 | 2/2015 | Skiba et al. |
| 9,570,090 B2 | 2/2017 | Gelfenbeyn et al. |
| 9,607,102 B2 | 3/2017 | Lavallee et al. |
| 9,674,355 B2 | 6/2017 | Odinak et al. |
| 9,704,172 B2 | 7/2017 | Murray |
| 9,990,591 B2 | 6/2018 | Gelfenbeyn et al. |
| 2005/0165631 A1 | 7/2005 | Horvitz |
| 2006/0233344 A1 | 10/2006 | Das et al. |
| 2008/0084989 A1 | 4/2008 | Dhanakshirur |
| 2012/0235850 A1 | 9/2012 | Yasue et al. |
| 2013/0275164 A1 | 10/2013 | Gruber et al. |
| 2015/0154967 A1 | 6/2015 | Grill et al. |
| 2015/0186156 A1* | 7/2015 | Brown .................. H04L 51/02 715/706 |
| 2015/0310849 A1 | 10/2015 | Onishi et al. |
| 2016/0035353 A1 | 2/2016 | Chen et al. |
| 2016/0098992 A1 | 4/2016 | Renard et al. |
| 2016/0351206 A1 | 12/2016 | Gelfenbeyn et al. |
| 2017/0017501 A1 | 1/2017 | Quast |
| 2017/0178626 A1 | 6/2017 | Gruber et al. |
| 2017/0277993 A1 | 9/2017 | Beaver et al. |
| 2017/0300831 A1 | 10/2017 | Gelfenbeyn et al. |
| 2017/0337383 A1 | 11/2017 | Eldar et al. |
| 2017/0359463 A1 | 12/2017 | Segalls et al. |
| 2018/0025726 A1 | 1/2018 | Gatti de Bayser et al. |
| 2018/0211663 A1 | 7/2018 | Shin et al. |
| 2019/0013017 A1 | 1/2019 | Kang et al. |
| 2019/0320281 A1* | 10/2019 | Guo ....................... H04S 3/008 |

FOREIGN PATENT DOCUMENTS

| | | |
|---|---|---|
| KR | 10-2017-0107058 A | 9/2017 |
| KR | 10-2017-0137884 A | 12/2017 |

* cited by examiner

FIG. 5A

| Items | Values | Satisfied or not |
|---|---|---|
| [User] Reserve a table for two at Sushi XX at 7 pm this Wednesday. [DAS] Okay, do you want to reserve a table at Sushi XX for two at 7 pm this Wednesday as indicated? | | |
| Requested service | Restaurant reservation | O |
| Name of restaurant | Sushi XX | O |
| Phone number | 010-XXXX-1234 | O |
| Date | Wednesday, July 11 | ? |
| Time | 7 pm | ? |
| Number of attendees | Two | ? |
| [User] Yes. | | |

[DAS] Calling 010-XXXX-1234

[SP] Hello, this is Sushi XX.
[DAS] Can I make a reservation for two at 7 pm this Wednesday?
[SP] Sorry, but seats are only available at 6 pm and 8 pm.
[DAS] Just one moment.

| Items | Values | Satisfied or not |
|---|---|---|
| Requested service | Restaurant reservation | O |
| Name of restaurant | Sushi XX | O |
| Phone number | 010-XXXX-1234 | O |
| Date | Wednesday, July 11 | O |
| Time | 7 pm | X |
| Number of attendees | Two | O |

[DAS] User, a 7 pm reservation is not available, but a 6 pm or 8 pm reservation is available.

[User] Okay, then make a reservation at 6 pm.

[DAS] Okay, I will make a reservation at 6 pm.

| Items | Values | Satisfied or not |
|---|---|---|
| Requested service | Restaurant reservation | O |
| Name of restaurant | Sushi XX | O |
| Phone number | 010-XXXX-1234 | O |
| Date | Wednesday, July 11 | O |
| Time | 6 pm | ? |
| Number of attendees | Two | O |

[DAS] Then, can I make a reservation at 6 pm?

[SP] Yes, I will reserve a table for two at 6 pm this Wednesday. What name will the reservation be listed under?

[DAS] Kim Young-seok.

[SP] Okay, you are booked, thank you.

[DAS] Thank you.

FIG. 5E

[DAS] Call ended

| [DAS] User, the reservation has made for two at Sushi XX at 6 pm this Wednesday. | | |
|---|---|---|
| Items | Values | Satisfied or not |
| Requested service | Restaurant reservation | O |
| Name of restaurant | Sushi XX | O |
| Phone number | 010-XXXX-1234 | O |
| Date | Wednesday, July 11 | O |
| Time | 6 pm | O |
| Number of attendees | Two | O |
| [User] Okay, thank you. | | |

| Items | Values | Satisfied or not |
|---|---|---|
| Requested service | Restaurant reservation | O |
| Name of restaurant | Sushi XX | O |
| Phone number | 010-XXXX-1234 | O |
| Date | Wednesday, July 11 | O |
| Time | 6 pm | O |
| Number of attendees | Two | O |

— 610

[DAS] Then, can I make a reservation at 6 pm?

[SP] Yes, I will reserve a table for two at 6 pm this Wednesday. What name will the reservation be listed under?

[DAS] Kim Young-seok.

[User] Reserve a table for two at Sushi XX at 7 pm this Wednesday.
[DAS] Okay, do you want to reserve a table at Sushi XX for two at 7 pm this Wednesday as indicated?

| Items | Values | Satisfied or not |
|---|---|---|
| Requested service | Restaurant reservation | O |
| Name of restaurant | Sushi XX | O |
| Phone number | 010-XXXX-1234 | O |
| Date | Wednesday, July 11 | ? |
| Time | 7 pm | ? |
| Number of attendees | Two | ? |

[User] Yes.

[DAS] Calling 010-XXXX-1234

[SP] Hello, this is Sushi XX.
[DAS] Can I make a reservation for two at 7 pm this Wednesday?
[SP] Sorry, but seats are only available at 6 pm and 8 pm.

[User] Direct conversation

[User] Then, can I make a reservation at 6 pm?
[SP] Yes, I will reserve a table for two at 6 pm this Wednesday. What name will the reservation be listed under?
[User] Kim Young-seok.
[SP] Okay, you are booked, thank you.
[User] Thank you.

Direct conversation — 710

OPERATION METHOD OF DIALOG AGENT AND APPARATUS THEREOF

CROSS-REFERENCE TO RELATED APPLICATIONS

This application is a continuation of U.S. application Ser. No. 16/356,071 filed on Mar. 18, 2019, which in turn claims the benefit under 35 USC § 119(a) of Korean Patent Application No. 10-2018-0101285 filed on Aug. 28, 2018, in the Korean Intellectual Property Office, the entire disclosures of which are incorporated herein by reference for all purposes.

BACKGROUND

1. Field

The following description relates to an operation method of a dialog agent and an apparatus thereof.

2. Description of Related Art

The development of neural networks has promoted various artificial intelligence (AI) services and robot technologies that provide user convenience. A chatbot, for example, may make a simple reservation on behalf of a user based on an intention and an entity that is input from the user. A dialog agent system (DAS) may also make a reservation for a desired service through a phone on behalf of a user. However, in a case in which a conversation or a dialog is out of a simple question-and-answer form, for example, when a service provider offers other conditions different from a requirement requested by a user or when a requirement requested by a user is complicated, the chatbot or the DAS may not accurately process a request made by a user for a service. In addition, a user may not be able to directly intervene in a dialog while the DAS is operating.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an operation method of a dialog agent includes obtaining an utterance history including at least one of an outgoing utterance to be transmitted to request a service or at least one of an incoming utterance to be received to request the service, updating a requirement specification including items requested for the service based on the utterance history, generating utterance information to be used to request the service based on the updated requirement specification, and outputting the utterance information.

The requirement specification may include state information indicating whether requirements of the items are satisfied.

The state information may indicate at least one of a first state indicating that a requirement of a corresponding item is satisfied, a second state indicating that a requirement of a corresponding item is not satisfied, or a third state indicating that whether a requirement of a corresponding item is satisfied or not satisfied is not yet determined.

The updating may further include determining whether the requirements of the items are satisfied based on the utterance history, and updating the requirement specification based on a result of the determining.

The determining of whether the requirements are satisfied may include at least one of determining whether a requirement of at least one of the items is satisfied, or determining whether a requirement of at least one of the items is not satisfied.

The determining of whether the requirement of the at least one item is satisfied may include inputting the utterance history and the requirement specification to a classifier, which is configured to determine whether the requirements of the items are satisfied and output, as a multi-hot-vector, state information corresponding to the items, and determining whether the requirement of the at least one item is satisfied based on the multi-hot vector.

The determining of whether the requirement of the at least one item is not satisfied may include inputting the utterance history and the requirement specification to a classifier, which is configured to determine whether the requirements of the items are not satisfied and output, as a multi-hot vector, state information corresponding to the items, and determining whether the requirement of the at least one item is not satisfied based on the multi-hot vector.

The operation method may further include determining whether all the requirements of the items are satisfied, and notifying a user that the request for the service is completed based on a determination that all the requirements are satisfied.

The determining of whether all the requirements of the items are satisfied may include at least one of determining whether all the requirements are satisfied based on the updated requirement specification, or determining whether all the requirements are satisfied using a classifier configured to determine whether the requirements of the items are satisfied based on the utterance history and the requirement specification and output a value indicating whether all the requirements are satisfied.

The operation method may further include determining an utterance target based on the updated requirement specification. The outputting of the utterance information may include outputting the utterance information to the utterance target.

In response to a requirement of at least one of items included in the updated requirement specification not being satisfied, the determining of the utterance target may include determining the user to be the utterance target.

The items may include at least one required item set for each type of service.

The items may further include at least one optional item, excluding the required item.

The operation method may further include receiving, from a user device, a signal requesting a direct call with a provider of the service, suspending the generating of the utterance information after the signal requesting the direct call is received, providing information input from the user device to the provider of the service.

The operation method may further include receiving a signal requesting dialog resumption through the dialog agent, and resuming the generating of the utterance information in response to the signal requesting the dialog resumption.

The operation method may further include at least one of providing the updated requirement specification to the user, or providing the utterance history to the user.

In response to the requirement of the at least one item included in the updated requirement specification not being satisfied, the operation method may further include querying the user about the at least one item.

The operation method may further include receiving the requirement specification generated based on information collected through an interface of the user device.

The obtaining of the utterance history may include at least one of obtaining a first outgoing utterance to be transmitted from the dialog agent to the provider of the service, obtaining a first incoming utterance to be received by the dialog agent from the provider of the service, obtaining a second outgoing utterance to be transmitted from the dialog agent to the user, or obtaining a second incoming utterance to be received by the dialog agent from the user.

In another general aspect, a dialog agent apparatus includes a communication interface configured to obtain an utterance history including at least one of an outgoing utterance to be transmitted to request a service or at least one of an incoming utterance to be received to request the service, and to output utterance information, and a processor configured to update a requirement specification including items requested for the service based on the utterance history and generate the utterance information to be used to request the service based on the updated requirement specification.

The requirement specification may include state information indicating whether requirements of the items are satisfied.

The state information may indicate at least one of a first state indicating that a requirement of a corresponding item is satisfied, a second state indicating that a requirement of a corresponding item is not satisfied, or a third state indicating that whether a requirement of a corresponding item is satisfied or not satisfied is not yet determined.

The processor may be further configured to determine whether the requirements of the items are satisfied based on the utterance history and update the requirement specification based on a result of the determining.

The processor may be further configured to determine whether a requirement of at least one of the items is satisfied or determine whether a requirement of at least one of the items is not satisfied.

The processor may be further configured to input the utterance history and the requirement specification to a classifier, which is configured to determine whether the requirements of the items are satisfied and output, as a multi-hot-vector, state information corresponding to the items, and determine whether the requirement of the at least one item is satisfied based on the multi-hot vector.

The processor may be further configured to input the utterance history and the requirement specification to a classifier, which is configured to determine whether the requirements of the items are not satisfied and output, as a multi-hot vector, state information corresponding to the items, and determine whether the requirement of the at least one item is not satisfied based on the multi-hot vector.

The processor may be further configured to determine whether all the requirements of the items are satisfied, and notify a user that the request for the service is completed based on a determination that all the requirements are satisfied.

The processor may be further configured to determine whether all the requirements of the items are satisfied based on the updated requirement specification, or determine whether all the requirements of the items are satisfied using a classifier configured to determine whether the requirements are satisfied based on the utterance history and the requirement specification and output a value indicating whether all the requirements are satisfied.

The processor may be further configured to determine an utterance target based on the updated requirement specification and output the utterance information to the utterance target.

In response to a requirement of at least one of items included in the updated requirement specification not being satisfied, the processor may be further configured to determine the user to be the utterance target.

The items may include at least one required item set for each type of service.

The items may further include at least one optional item, excluding the required item.

The communication interface may be further configured to receive, from a user device, a signal requesting a direct call with a provider of the service. After the signal requesting the direct call is received, the processor may be further configured to suspend the generating of the utterance information and provide information input from the user device to the provider of the service.

The communication interface may be further configured to receive a signal requesting dialog resumption through the dialog agent apparatus. In response to the signal requesting the dialog resumption, the processor may be further configured to resume the generating of the utterance information.

The communication interface may be further configured to provide the updated requirement specification to the user, provide the utterance history to the user, or provide both the updated requirement specification and the utterance history to the user.

In response to the requirement of the at least one item included in the updated requirement specification not being satisfied, the processor may be further configured to query the user about the at least one item.

The communication interface may be further configured to receive the requirement specification generated based on information collected through an interface of the user device.

The communication interface may be further configured to obtain at least one of a first outgoing utterance to be transmitted from the dialog agent apparatus to a provider of the service, a first incoming utterance to be received by the dialog agent apparatus from the provider of the service, a second outgoing utterance to be transmitted from the dialog agent apparatus to the user, or a second incoming utterance to be received by the dialog agent apparatus from the user.

In another general aspect, a dialog agent includes a memory and a processor coupled to the memory, the processor being configured to receive, from a user device, requirements related to a request for a service; generate a requirement specification based on the requirements; establish a connection with a provider of the service based on the requirement specification; determine, during the connection, whether all of the requirements are satisfied by the provider; in a case in which all of the requirements are satisfied, notify the user device that the request for the service is complete; and in a case in which all of the requirements are not satisfied, notify the user device that at least one requirement is not satisfied, receive a changed requirement related to the at least one requirement that is not satisfied, and update the requirement specification based on the changed requirement.

The processor may be configured to establish a second connection with the provider based on the updated requirement specification; and determine, during the second connection, whether all of the requirements related to the updated requirement specification are satisfied by the provider.

In a case in which the requirements received from the user device are in the form of natural language, the processor may be configured to analyze the natural language, determine a field or type of the service based on analyzing the natural language, and generate the requirement specification based on the determined field or type.

In a case in which the requirements received from the user device are in the form of text, the processor may be configured to separate the text into tokens, input the separated tokens into a neural network model, and generate the requirement specification based on an output of the neural network model.

Other features and aspects will be apparent from the following detailed description, the drawings, and the claims.

BRIEF DESCRIPTION OF DRAWINGS

FIGS. 5A, 5B, 5C, 5D, and 5E are diagrams illustrating an example of how a requirement specification is updated as a dialog develops.

FIG. 6 is a diagram illustrating an example of how a dialog agent displays an utterance history and a requirement specification.

FIG. 7 is a diagram illustrating an example of a user interface of a dialog agent.

Figure 1:
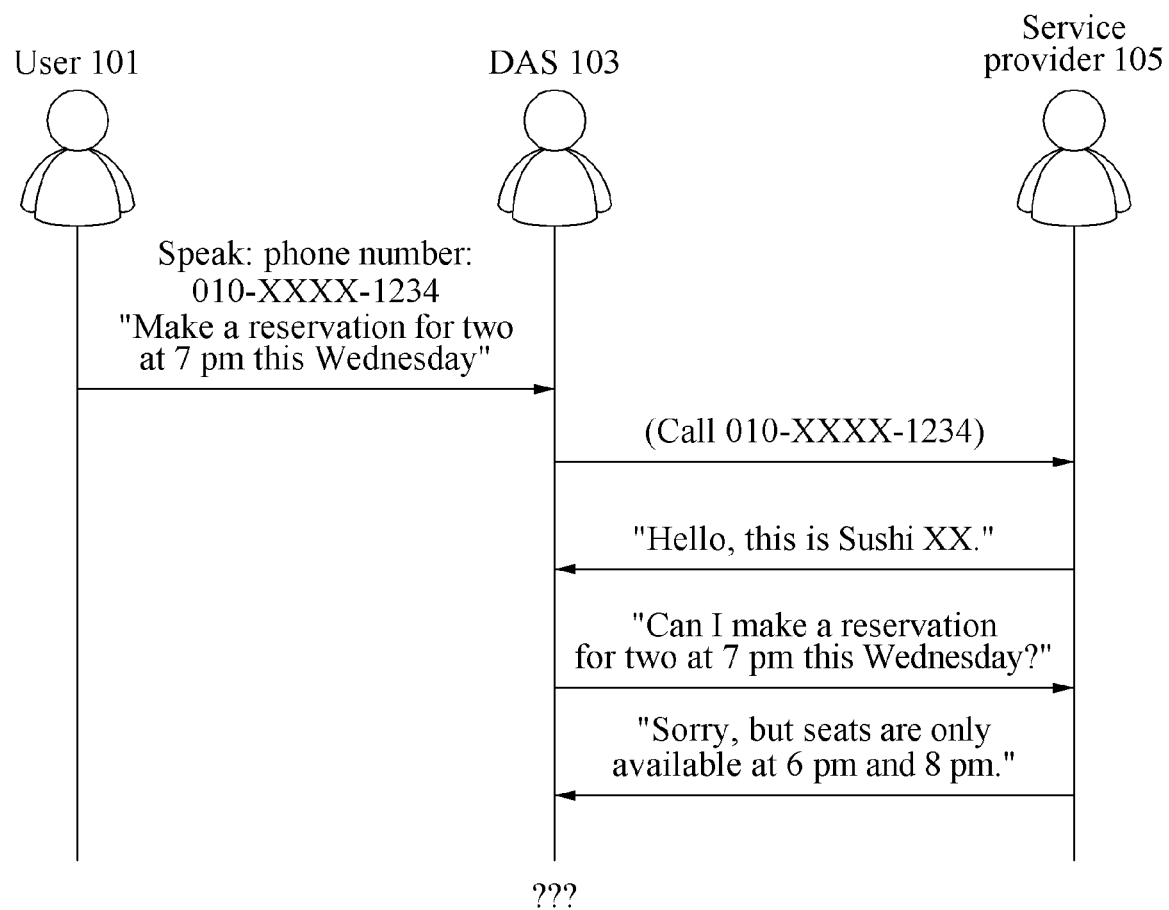
FIG. 1 is a diagram illustrating an example of a dialog agent system (DAS) of a basic type.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, expressions, for example, "between" and "immediately between," and "adjacent to" and "immediately adjacent to" may also be construed as described in the foregoing.

As used herein, the term "and/or" includes any one and any combination of any two or more of the associated listed items.

Unless otherwise defined, all terms, including technical and scientific terms, used herein have the same meaning as commonly understood by one of ordinary skill in the art to which the disclosure of this application pertains. Terms, such as those defined in commonly used dictionaries, are to be interpreted as having a meaning that is consistent with their meaning in the context of the relevant art and are not to be interpreted in an idealized or overly formal sense unless expressly so defined herein.

FIG. 1 is a diagram illustrating an example of a dialog agent system (DAS) of a basic type. In the example of FIG. 1, a user 101, a DAS 103, and a service provider 105 are illustrated. The user 101 may be a user of a user device or a user terminal, and the service provider 105 may be a provider of a service and also a user of a service provider device or terminal.

Referring to FIG. 1, the user 101 requests a reservation for a dinner through the DAS 103. The user 101 notifies the DAS 103 of requirements needed for the reservation including, for example, contact information of a desired place for the reservation, a reservation time, and the place to be reserved, by speaking "phone number: 010-XXXX-1234" and "make a reservation for two at 7 pm this Wednesday." The DAS 103 receiving such an utterance from the user 101 makes a call on the phone number 010-XXXX-1234. In this example, when an entity corresponding to the phone number 010-XXXX-1234 is a restaurant called Sushi XX, the service provider 105 may be a reservation receiver, a receptionist, or a manager of Sushi XX.

When the service provider 105 receiving the call from the DAS 103 responds, for example, "hello, this is Sushi XX," the DAS 103 transmits, to the service provider 105, the requirements requested by the user 101 by speaking, for example, "can I make a reservation for two at 7 pm this Wednesday?"

In this example, when a reservation corresponding to the requirements is available, the service provider 105 proceeds with a process needed for the reservation corresponding to the requirements. However, when the reservation corresponding to the requirements is not available, the service provider 105 suggests a changed reservation condition by speaking, for example, "sorry, but seats are only available at 6 pm and 8 pm." In this case, the DAS 103 provides the user 101 with a service request result indicated as, for example, "reservation unavailable," because the requirements are not satisfied. Thus, in a case in which a conversation or a dialog is out of a simple question-and-answer form, for example, when the service provider 105 suggests another changed condition different from the requirements requested by the user 101 as illustrated or when a requirement requested by the user 101 is extremely completed, the DAS 103 of a basic type as illustrated in FIG. 1 may not readily process the requirements requested by the user 101.

For another example, when a 6 pm or 8 pm reservation is available although a 7 pm reservation on a desired date is not available, the user 101 may flexibly change a reservation time to 6 pm or 8 pm through a direct conversation with the service provider 105. However, when the user 101 is not allowed to directly intervene in a dialog between the DAS 103 and the service provider 105, making a reservation for the dinner on the date may not be possible unless the user 101 ends the dialog between the DAS 103 and the service provider 105 and then requests again a reservation at the changed reservation time, for example, 6 pm or 8 pm, through the DAS 103.

Figure 2:
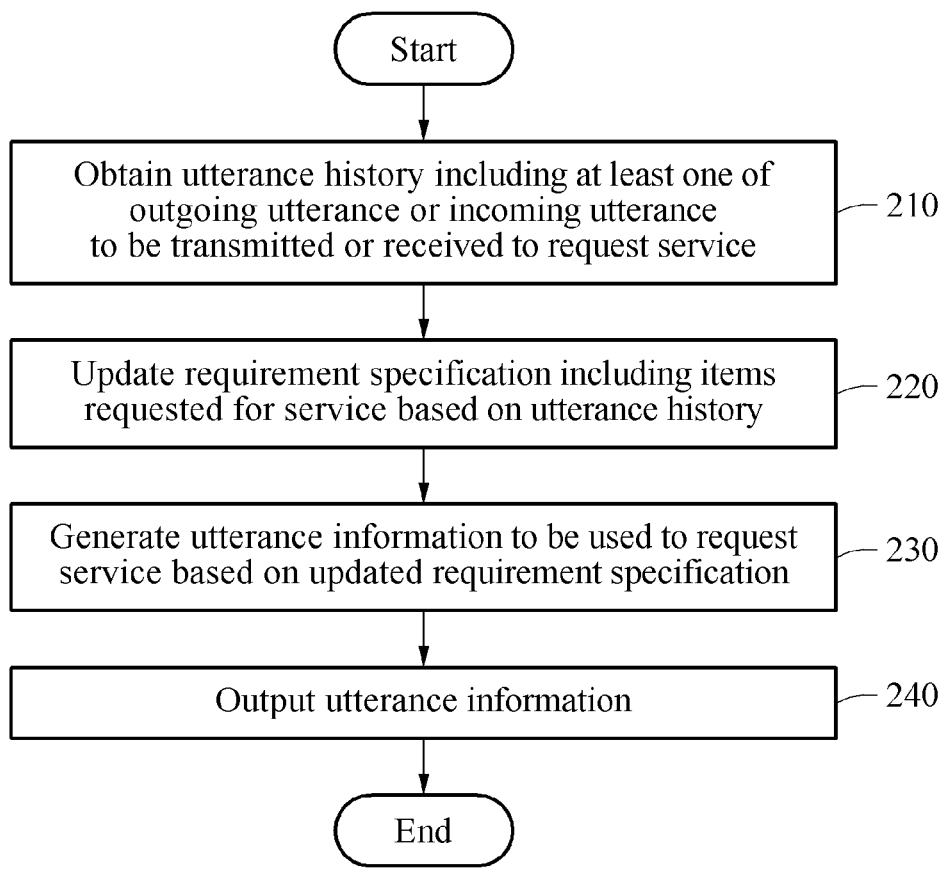
FIG. 2 is a flowchart illustrating an example of an operation method of a dialog agent.

FIG. 2 is a flowchart illustrating an example of an operation method of a dialog agent. Referring to FIG. 2, in operation 210, a dialog agent apparatus obtains an utterance history including at least one of an outgoing utterance or an incoming utterance to be transmitted or received to request a service. The service may include, for example, a reservation service for various reservations such as a travel reservation, a restaurant reservation, a hair salon reservation, a rental car reservation, a stage performance reservation, an accommodation reservation, and the like, and include other services, for example, a registration service, a phone inquiry service, and the like. However, the service is not limited to the examples described in the foregoing.

The terms "utterance" and "utter/uttering" used herein may indicate a realization of human thoughts or ideas by an actual sentence unit, or a verbal expression or action. A detailed meaning of an utterance may vary or be determined based on a target of the utterance, for example, a listener and a speaker, a situation of the utterance, a topic of the utterance, and the like. The terms "utterance" and "utter/uttering" used herein may also be construed as encompassing all forms of expression of human thoughts or ideas, for example, an expression in a form of text, in addition to a verbal expression of human thoughts or ideas.

The outgoing utterance corresponds to an utterance to be transmitted from the dialog agent apparatus to a dialog counterpart which is a counterpart having a conversation or a dialog with the dialog agent apparatus. The incoming utterance corresponds to an utterance to be received by the dialog agent apparatus from the dialog counterpart. Herein, a target of the outgoing utterance and a target of the incoming utterance may be a user device or a user, and/or a service provider device or a service provider. The target of the outgoing utterance and the target of the incoming utterance may be the same, or different from each other.

The outgoing utterance may be in a form of, for example, speech and text. The incoming utterance may be in a form of, for example, speech, text, and command. For example, the incoming utterance in a form of command may be transmitted when a user speaks a predefined command, for example, "make a call for reservation" and "make a reservation," in a natural language, or writes such a command in a text. For another example, the incoming utterance in a form of command may also be transmitted when a user selects a button, an icon, or others indicating, for example, "request a service," "have a direct conversation," and "directly stop a dialog," from a display of a user device or terminal, or through a user interface (UI).

The utterance history may be stored in a form of speech or text based on a device characteristic of a user device. The utterance history may also be stored in a form of feature vector. Herein, the device characteristic may be a functional characteristic of the user device indicating whether the user device includes only a display or a speaker, or includes both the display and the speaker.

For example, in a case in which the incoming utterance is in a form of speech, the dialog agent apparatus may convert a speech to a corresponding text and store the text in the utterance history. For another example, in a case in which the incoming utterance is in a form of command, the dialog agent apparatus may convert a command to a corresponding text or a text in a predefined form and store the text in the utterance history.

For example, the utterance history may include at least one of a first outgoing utterance to be transmitted from a dialog agent (or the dialog agent apparatus) to the service provider, a first incoming utterance to be received by the dialog agent from the service provider, a second outgoing utterance to be transmitted from the dialog agent to the user, or a second incoming utterance to be received by the dialog agent from the user.

The utterance history may include at least a portion or all of contents of outgoing utterances and/or incoming utterances generated, for example, from when a requirement specification is initially drafted in a user device of a user to when the dialog agent notifies the user device of completion of a request for a service made by the user.

In operation 220, the dialog agent apparatus updates a requirement specification including items requested for the service based on the utterance history obtained in operation 210. For example, in a case in which the service requested by the user is a hair salon reservation, the items requested for the service may include, for example, a contact number of a desired hair salon to be reserved, a reservation time, a desired service the user desires to receive (i.e., haircut, perm, haircoloring, etc.), a hair designer, and the like. For another example, in a case in which the service requested by the user is a stage performance reservation, the items requested for the service may include, for example, a contact number of a concert hall or a reservation department, a target performance to be reserved, a performance time, a seating class, a seat location, and the like. As described in these examples, items requested for a service may be determined differently based on a type of service and also be comprehensively determined, independently from a type of service.

Figure 3:
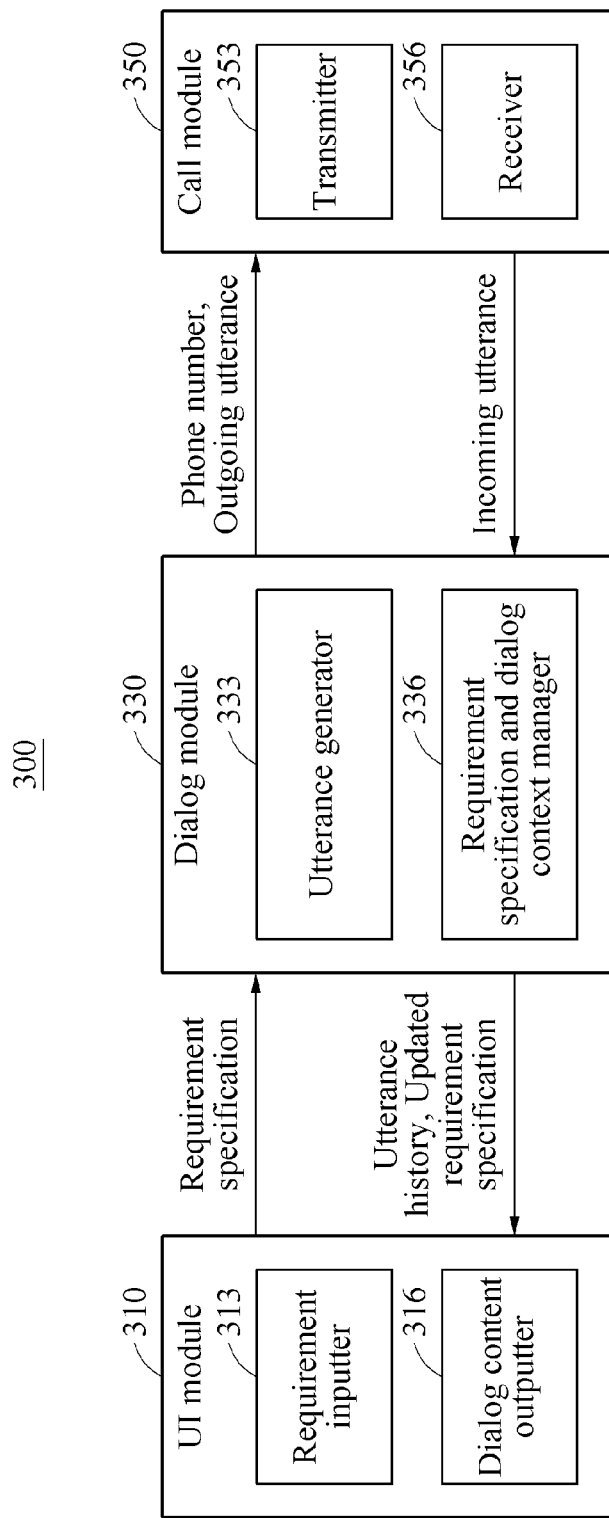
FIG. 3 is a diagram illustrating an example of a configuration of a DAS.

For example, the requirement specification may be generated based on information collected through an interface of a user device or terminal, for example, a UI module 310 illustrated in FIG. 3, and transmitted to the dialog agent apparatus. The items included in the requirement specification may include at least one required item that is defined based on a type of service. In addition, the items included in the requirement specification may also include at least one optional item, excluding the required item. The required item or the optional item may be determined based on contents of an utterance or a speech of the user. The requirement specification may also include state information indicating whether requirements of the items are satisfied. For example, the state information may indicate at least one of a first state indicating that a requirement of a corresponding item is satisfied, a second state indicating that a requirement of a corresponding item is not satisfied, or a third state indicating that whether a requirement of a corresponding item is satisfied or not satisfied is not yet determined. For example, the first state may be indicated by "O", the second state may be indicated by "X", and the third state may be indicated by "?" in the requirement specification. The state information may be updated based on an incoming utterance to be received as a response to an outgoing utterance of the dialog agent apparatus.

In operation 220, the dialog agent apparatus also determines whether the requirements of the items are satisfied based on the utterance history and/or the requirement specification. For example, the dialog agent apparatus may determine whether a requirement of at least one of the items is satisfied. In this example, the dialog agent apparatus may input the utterance history and the requirement specification to a first classifier. The first classifier may be configured to determine whether the requirements of the items are satisfied and output state information corresponding to the items as a multi-hot vector. The dialog agent apparatus may thus determine whether the requirement of the at least one item is satisfied based on the multi-hot vector output from the first classifier.

The dialog agent apparatus may also determine whether a requirement of at least one of the items is not satisfied. The dialog agent apparatus may input the utterance history and the requirement specification to a second classifier. The second classifier may be configured to determine whether the requirements of the items are not satisfied and output state information corresponding to the items as a multi-hot vector. The dialog agent apparatus may thus determine whether the requirement of the at least one item is not satisfied based on the multi-hot vector output from the second classifier.

The dialog agent apparatus may update the requirement specification based on a result of determining whether the requirements are satisfied. How the dialog agent apparatus updates the requirement specification will be described in detail with reference to FIGS. 5A through 5E.

In operation 230, the dialog agent apparatus generates utterance information to be used to request the service based on the updated requirement specification. The utterance information may be information to be used to generate an outgoing utterance, and output in a form of speech or text.

In operation 240, the dialog agent apparatus outputs the utterance information. For example, the dialog agent apparatus may determine an utterance target based on the updated requirement specification, and output the utterance information to the determined utterance target. The utterance target may be the user, the service provider, or a third party. In an example, when a requirement of at least one of items included in the updated requirement specification is not satisfied, the dialog agent apparatus may determine the utterance target to be the user.

In addition, the dialog agent apparatus may determine whether all the requirements of the items are satisfied. For example, the dialog agent apparatus may determine whether all the requirements of the items are satisfied based on the updated requirement specification. The dialog agent apparatus may also determine whether all the requirements of the items are satisfied using a third classifier. The third classifier may be configured to determine whether all the requirements of the items are satisfied based on the utterance history and the requirement specification, and output a value, for example, a binary value of 0 or 1, indicating whether all the requirements are satisfied. The dialog agent apparatus may notify the user that the request for the service is completed based on a determination output from the third classifier that all the requirements are satisfied. The dialog agent apparatus may notify the user of the completion of the request for the service in a form of speech through a speaker, for example, "reservation is completed," or in a form of text to be displayed on a display of the dialog agent apparatus.

FIG. 3 is a diagram illustrating an example of a configuration of a DAS. Referring to FIG. 3, a DAS 300 includes an UI module 310, a dialog module 330, and a call module 350. The UI module 310 may be included in a user device or a user terminal, or in a dialog agent apparatus. Herein, the dialog agent apparatus may be included in the DAS 300, and the dialog module 330 may be included in the dialog agent apparatus.

The UI module 310 may provide an input interface configured to receive, as an input, a request for a service and/or a requirement requested for the service from a user, and provide an output interface configured to display a progress of the request for the service. In response to a requirement being input, the UI module 310 may transmit, to the dialog module 330, a requirement specification including items requested for the service. In addition, the UI module 310 may transmit, to the user, information as to how a dialog being held for the request for the service develops through the output interface.

The UI module 310 includes a requirement inputter 313 and a dialog content outputter 316.

The requirement inputter 313 may provide the input interface configured to receive a requirement for the service from the user. An input modality of the input interface may be a speech, for example, a speech input in natural language, a text input by typing, or a command input by clicking an icon or button. When the requirement inputter 313 fills values in the items in the requirement specification that are set by each type of service based on requirements collected from the input interface, inputting initial information to the requirement specification may be completed. Herein, the user may input a desired service on request and a requirement for the service based on a conversation or a dialog in natural language.

The requirement inputter 313 may analyze a natural language input through the input interface and discover the desired service and the values corresponding to the items requested for the service. For example, the requirement inputter 313 may discover a service desired by the user and a value corresponding to an item requested for the service from an input natural language, using a neural network model based on domain and intent classification technology and slot tagging technology. For example, in a case in which an input modality of the input interface is a text, the requirement inputter 313 may parse the text and separate the text into n-gram tokens, or parse the text based on a predefined lexicon or dictionary and separate the text into words, for example, tokens, in the dictionary. The requirement inputter 313 may input the separated tokens into the neural network model to discover the service desired by the user and the value of the item requested for the service.

In a case in which the input modality is a natural language, the requirement inputter 313 may recognize the natural language using a speech recognizer, and discover the service desired by the user and the value of the item requested for the service based on a result of the recognizing. In this example, the requirement inputter 313 may determine a field or a type of service desired by the user based on a result of analyzing the natural language, and generate the requirement specification including items preset for a service corresponding to the determined field or type of service. In a case in which the requirement inputter 313 is not able to fill values in all the items requested for the service, for example, values of required items, by a speech uttered once by the user, the requirement inputter 313 may receive, from the user, a value of a needed item through an additional inquiry. The requirement inputter 313 may also allow the user to directly select a desired service and directly input a value of each of the items based on the requirement specification set by each service. Thus, when inputting the initial information to the requirement specification is completed, the requirement inputter 313 may provide the requirement specification to the dialog module 330.

The dialog content outputter 316 may provide the output interface configured to output a current progress of the request for the service to the user. For example, the output interface may provide the user with an utterance history, for example, information about a dialog with the user to receive a requirement requested by the user from the requirement inputter 313, the requirement specification generated as a result of completing an input of the requirement by the requirement inputter 313, an outgoing utterance generated in the dialog module 330, an incoming utterance in response to the outgoing utterance, a notification to be provided to the user when an item of which a corresponding requirement is not satisfied is present in the items included in the requirement specification, and the like. The information to be provided to the user through the output interface may be in a form of, for example, a natural language utterance, a natural language text, and the like. According to an example, the information to be provided to the user through the output interface may also be in a form of alarm sound.

The dialog content outputter 316 may differently indicate, in the requirement specification, an utterance content corresponding to an item of which a corresponding requirement is not satisfied and an utterance content corresponding to an item for which satisfaction of a corresponding requirement is not yet determined. Herein, the utterance content corresponding to the item of which the requirement is not satisfied or the utterance content corresponding to the item for which the satisfaction of the requirement is not yet determined may correspond to state information indicating a second state or state information indicating a third state, respectively.

For example, the dialog content outputter 316 may indicate, by a highlight or a blink in the requirement specification, the utterance content corresponding to the item of which the requirement is not satisfied or the item for which the satisfaction of the requirement is not yet determined. The information to be provided to the user through the output interface may be provided to the user in a form of text on a display as illustrated in FIG. 5A through 5E, or in a form of sound through a speaker. In addition, when there is such an utterance content corresponding to the item for which the requirement is not satisfied in the requirement specification, the dialog content outputter 316 may also provide an additional notification to the user.

The dialog module 330 may allow the call module 350 to make a phone call to a service provider (i.e., SP as illustrated in the drawings), which is a provider of the service, by referring to a value of an item related to a phone number in the requirement specification that is received from the UI module 310. The dialog module 330 may update the requirement specification based on a result of the phone call to the service provider, and generate utterance information to be used to request the service based on the updated requirement specification.

The dialog module 330 includes an utterance generator 333 and a requirement specification and dialog content manager (hereinafter simply referred to as "manager") 336.

The utterance generator 333 may generate the utterance information, for example, a sentence needed to request the service, based on at least one of the requirement specification received from the UI module 310 or the utterance history received from the manager 336. The utterance generator 333 may generate the utterance information based on values of the items, in addition to the value of the item related to the phone number, which are included in the requirement specification, and the utterance history hitherto recorded. The utterance information generated by the utterance generator 333, for example, a sentence or phrase in a form of text, may be converted to voice or speech through a text-to-speech (TTS) function, and the utterance information converted to voice may be provided as an outgoing utterance to the call module 350. The manager 336 may receive, from the call module 350, an incoming utterance as a response of the service provider to the outgoing utterance.

The manager 336 may update the requirement specification based on a turn of an incoming utterance. For example, the manager 336 may determine whether a response to an outgoing utterance of the dialog agent apparatus corresponds to a turn of utterance, and determine whether reception of the response is completed. Herein, a turn of utterance may indicate a change of a speaker or a completion of a response of a speaker. For example, when a speaker of utterance changes, or when a preset amount of time elapses after a speaker gives an utterance, for example, when there is three seconds of silence after an utterance of a speaker, the manager 336 may determine that a response corresponds to one turn of utterance and complete the reception of the response.

When reception of a response is completed, the manager 336 may update the requirement specification by determining whether the requirements of the items included in the requirement specification are newly satisfied based on the response, for example, whether the state information corresponding to the items included in the requirement specification are changed.

The manager 336 may determine whether all requirements of items included in the updated requirement specification are satisfied. In response to a determination that all the requirements are satisfied, the manager 336 may end the call. For example, the manager 336 may determine whether all the requirements are satisfied using a third classifier. The third classifier may be a binary classifier based on a neural network trained to determine whether all the requirements of the items included in the requirement specification are satisfied.

To end the call, the dialog module 330 may allow the utterance generator 333 to generate utterance information needed to end the call, for example, an utterance notifying the user of completion of the request for the service, and output the generated utterance information, and then allow the manager 336 to end the call.

The manager 336 may input the utterance history and the requirement specification to a first classifier, and determine whether a requirement of an item among the items in the requirement specification is satisfied based on a multi-hot vector output from the first classifier to update the requirement specification. The first classifier may be, for example, a neural network-based multi-class classifier configured to output, as a multi-hot vector, items of which corresponding requirements in the requirement specification are satisfied. For example, in a case in which there is a total of ten items in the requirement specification and corresponding requirements of two items among the ten items, for example, a first item and a second item of the ten items, are satisfied, the first classifier may output a multi-hot vector, for example, 1100000000, in which values of a first class and a second class among ten classes are 1.

In addition, the manager 336 may input the utterance history and the requirement specification to a second classifier, and determine whether a requirement of at least one of the items in the requirement specification is not satisfied based on a multi-hot vector output from the second classifier to update the requirement specification. The second classifier may also be a neural network-based multi-class classifier, similarly to the first classifier.

The first classifier, the second classifier, and/or the third classifier may be embodied by a neural network of various structures, such as, for example, a convolutional neural network (CNN), a deep neural network (DNN), a recurrent neural network (RNN), and a bidirectional long short-term memory (BLSTM).

When there is an item of which a corresponding requirement is not satisfied, the manager 336 may notify the user of the item of which the requirement is not satisfied through the UI module 310, and receive a changed requirement from the user to update the requirement specification. Herein, the UI module 310 may indicate, by a highlight in the requirement specification, the item of which the requirement is not satisfied. In addition, the UI module 310 may highlight or blink an outgoing or incoming utterance sentence related to the item of which the requirement is not satisfied. The requirement specification updated by the changed requirement may be a requirement specification to which the changed requirement is applied, or a requirement specification for cancelling the request for the service. Hereinafter, how the updated requirement specification and the utterance history are indicated and displayed to a user will be described in detail with reference to FIGS. 5A through 5E and FIG. 6.

The dialog module 330 may perform operations 430 through 480 to be described hereinafter with reference to FIG. 4 repeatedly until all the requirements of the items are satisfied and the request for the service is thus completed.

The dialog module 330 may determine whether a signal requesting a direct call to the service provider is received from the user, or the user device or terminal, while repeatedly performing such dialog-related operations. When the signal requesting the direct call is determined to be received, the dialog module 330 may provide an interface enabling the user to have a direct conversation or dialog with the service provider during a dialog with the service provider. An example of the direct conversation or dialog between the user and the service provider will be described in detail with reference to FIG. 7.

The call module 350 includes a transmitter 353 and a receiver 356. The transmitter 353 may transmit an outgoing utterance generated in the dialog module 330. The receiver 356 may transmit, to the dialog module 330, an incoming utterance received from the user or the service provider.

Figure 4:
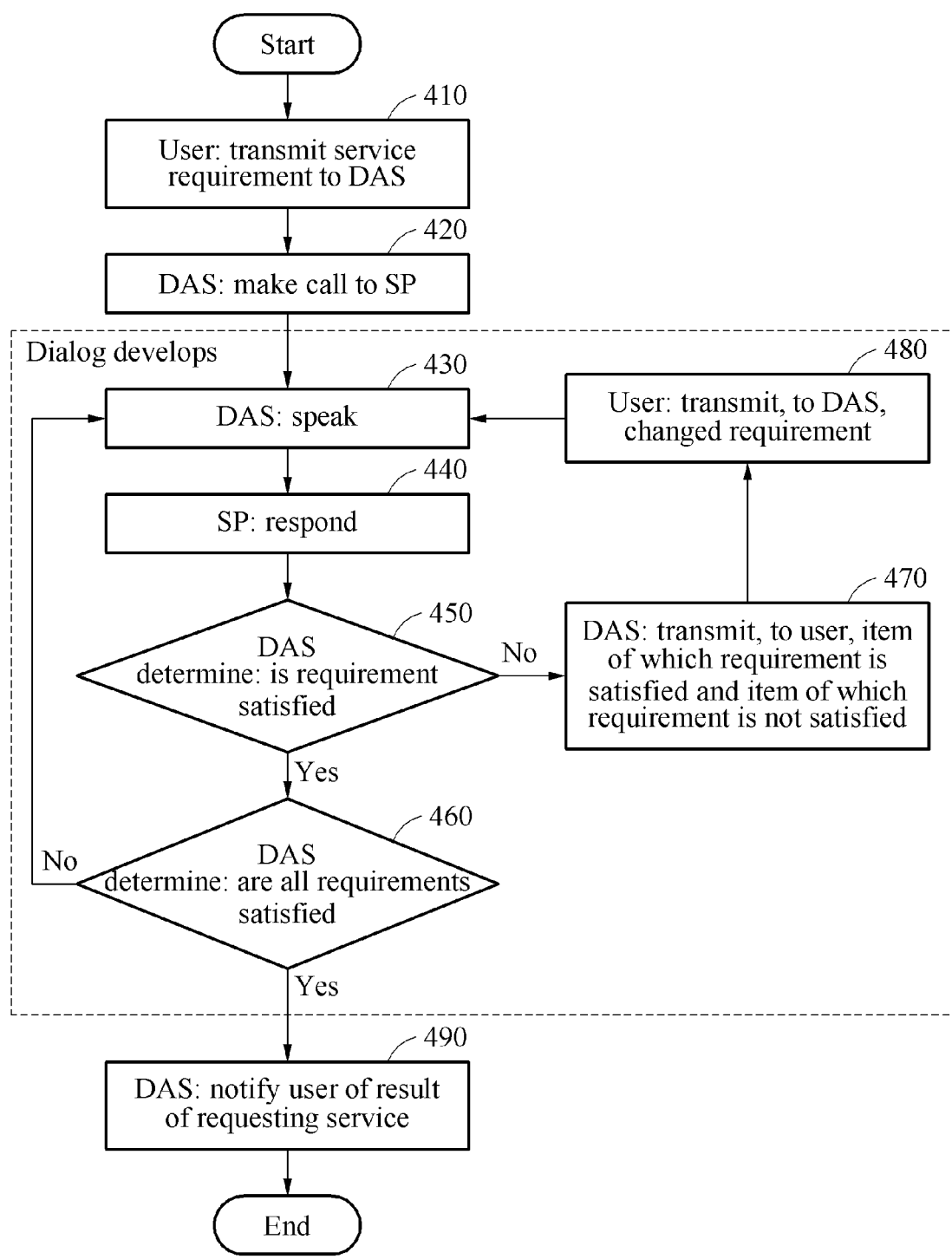
FIG. 4 is a flowchart illustrating an example of a dialog scenario of a dialog agent.

FIG. 4 is a flowchart illustrating an example of a dialog scenario of a dialog agent. FIGS. 5A through 5E are diagrams illustrating an example of how a requirement specification is updated as a dialog develops. FIGS. 4 and 5A through 5E illustrate an example of how a dialog develops when a user device or terminal transmits, to the DAS, a requirement requested by a user for a service.

Referring to FIG. 4, in operation 410, the user transmits requirements requested for the service to the DAS by transmitting a requirement specification through the user device. For example, as illustrated in FIG. 5A, the user may transmit requirements for a service by speaking, for example, "reserve a table for two at Sushi XX at 7 pm this Wednesday." The DAS may then verify the requirements by responding, for example, "okay, do you want to reserve a table at Shushi XX for two at 7 pm this Wednesday as indicated?," and generate a requirement specification 510 by analyzing the requirements. When generating the requirement specification 510, the DAS may fill a value of each corresponding item in the requirement specification 510 based on initial information of the requirement specification 510, for example, a requested service: restaurant reservation, a name of the restaurant: Sushi XX, and a phone number: 010-XXXX-1234, that is determined by the requirements requested by the user. When filling values of items in the requirement specification 510, state information corresponding to each of the items may be indicated by O, X, or ? based on whether a requirement of a corresponding item is satisfied or not satisfied, or whether satisfaction of the requirement is not yet determined. In this example, the phone number corresponding to the initial information may be a phone number retrieved from a phone directory stored in the user device or a phone directory included in the DAS, or a phone number retrieved through Internet access by the DAS.

In operation 420, the DAS makes a call to a service provider. In operation 430, the DAS generates utterance information to proceed a dialog and outputs the generated utterance information to the service provider. In operation 440, the service provider responds to a speech of the DAS. In operation 450, the DAS determines whether the requirements are satisfied or not satisfied through a dialog or a call with the service provider. In operation 470, when the requirements are determined not to be satisfied, the DAS transmits, to the user, an item of which a corresponding requirement is satisfied and an item of which a corresponding requirement is not satisfied.

For example, as illustrated in FIG. 5B, the DAS may make a call to the service provider and output utterance information generated to develop a dialog, for example, "can I make a reservation for two at 7 pm this Wednesday?" In this example, when the service provider responds, for example, "sorry, but seats are only available at 6 pm and 8 pm," to the DAS, the DAS may analyze the response of the service provider and determine that some requirements in the requirement specification 510 are satisfied by a value of a date item, for example, "this Wednesday," and a value of an attendee number item, for example, "two," and determine that a requirement in the requirement specification 510 is not satisfied by a value of a time item, for example, "7 pm." The DAS may then update the requirement specification 510 to be a requirement specification 520 as illustrated in FIG. 5B based on a result of determining whether a requirement of each item is satisfied or not satisfied.

In operation 480, the user receiving, from the DAS, the item of which the requirement is satisfied and the item of which the requirement is not satisfied transmits, to the DAS, a changed requirement of the item of which the original requirement is not satisfied. The DAS receiving the changed requirement of the item of which the original requirement is not satisfied may update the requirement specification based on the changed requirement.

For example, as illustrated in FIG. 5C, the DAS may generate an outgoing utterance, for example, "user, a 7 pm reservation is not available, but a 6 pm or 8 pm reservation is available," to transmit, to the user, the item of which the requirement is satisfied and the item of which the requirement is not satisfied. The user receiving this may transmit, to the DAS, a changed requirement of the item of which the original requirement is not satisfied by speaking, for example, "okay, then make a reservation at 6 pm." The DAS may then generate an outgoing utterance, for example, "okay, I will make a reservation at 6 pm," that verifies an incoming utterance received from the user. The DAS may update the requirement specification 520 to be the requirement specification 530 by applying the changed requirement, for example, 6 pm, to the requirement specification 520. In this example, whether a requirement of the time item, for example, 6 pm, is satisfied and not satisfied is not yet determined, and thus state information corresponding to the time item may be changed to ?.

According to an example, when a requirement of at least one of items included in the updated requirement specification is not satisfied, the DAS may query the user about the at least one item.

The DAS may generate new utterance information in operation 430 based on the requirement specification 530 obtained through the updating based on the changed requirement of the item of which the original requirement is not satisfied. Herein, the changed requirement may be transmitted from the user in operation 480. For example, as illustrated in FIG. 5D, the DAS may generate new utterance information, for example, "then, can I make a reservation at 6 pm?," based on the updated requirement specification 530 and output the generated new utterance information in operation 430. In operation 440, the DAS receives a response, for example, "yes, I will reserve a table for two at 6 pm this Wednesday" and "what name will the reservation be listed under?" as illustrated in FIG. 5D, which corresponds to the new utterance information. In operation 450, the DAS determines whether the changed requirement is satisfied based on a dialog or call with the service provider.

In operation 460, when the requirement is determined to be satisfied in operation 450, the DAS determines whether all the requirements requested by the user are satisfied. When all the requirements are determined not to be satisfied in operation 460, the DAS may generate new utterance information based on a requirement that is not satisfied and outputs the generated new utterance information in operation 430.

In operation 490, when all the requirements are determined to be satisfied in operation 460, the DAS notifies the user of a result of requesting the service, for example, notifies the user that the request for the service is completed. For example, as illustrated in FIG. 5E, when all the requirements in a requirement specification 540, the DAS may notify the user that the request for the service is completed, for example, "user, the reservation has made for two at Sushi XX at 6 pm this Wednesday."

FIG. 6 is a diagram illustrating an example of how a dialog agent displays an utterance history and a requirement specification. FIG. 6 illustrates an example of a display provided through a UI module of a dialog agent apparatus. The dialog agent apparatus may display a requirement specification along with contents of a dialog to be scrolled in sequential order, or separately display the requirement specification and the contents of the dialog.

For example, as illustrated in FIG. 6, the dialog agent apparatus may display a requirement specification 610 on an upper end portion of its display, and display an utterance history 630 below the requirement specification 610. In this example, state information indicating a value of each item in the requirement specification 610 and/or whether a requirement of each item in the requirement specification 610 is satisfied may be updated each time one turn of utterance is changed in the utterance history 630.

According to an example, a user may change whether to display the utterance history 630 based on settings. In addition, the user may set a portion or all of the requirement specification 610 to be displayed. For example, the user may set, not to be displayed, items of which corresponding requirements in the requirement specification 610 are satisfied. Alternatively, the user may set, to be displayed, items of which corresponding requirements in the requirement specification 610 are not satisfied or items for which satisfaction of corresponding requirements in the requirement specification 610 is not yet determined. In this example, the items of which the requirements are not satisfied or the items for which the satisfaction of the corresponding requirements is not yet determined may be displayed in a form of notification, or in a form of highlight or blink.

According to an example, the dialog agent apparatus may differently display a dialog between the user and the dialog agent apparatus and a dialog between the dialog agent apparatus and a service provider. In addition, the dialog agent apparatus may allow the service provider to view or hear the dialog between the user and the dialog agent apparatus, or not to view or hear the dialog between the user and the dialog agent apparatus.

FIG. 7 is a diagram illustrating an example of a UI of a dialog agent. Referring to FIG. 7, a signal requesting a direct call with a service provider may be received from a user, or a user device, during a dialog between a dialog agent apparatus and the service provider.

For example, the dialog agent apparatus may receive a response, for example, "sorry, but seats are only available at 6 pm and 8 pm," from the service provider during the dialog between the dialog agent apparatus and the service provider, and then the user may transmit the signal requesting the direct call with the service provider through a UI, for example, a button 710. In this example, the signal requesting the direct call may be transmitted to the dialog agent apparatus when the user speaks a predefined command keyword, for example, "direct conversation," through a provided UI, pushes the button 710 indicating "direct conversation" displayed on a display as illustrated in FIG. 7, or types "direct conversation."

When the signal requesting the direct call is transmitted, the dialog agent apparatus may suspend generation of utterance information and transmit an utterance content of the user, for example, a speech obtained through conversion from a content typed by the user through a TTS function, as an outgoing utterance to the service provider.

The dialog agent apparatus may transmit, to an UI module, a response of the service provider to allow the UI module to output the response in a form of sound and/or text, and may thus allow the user and the service provide to have a direct conversation or dialog. For example, an utterance content of the user may be provided by a voice of the user, or converted to a voice of the dialog agent apparatus in lieu of the voice of the user through a combination of an automatic speech recognition (ARS) function and the TTS function, and be transmitted as the outgoing utterance to the service provider. In this example, a content of the direct conversation between the user and the service provider may also be included in the utterance history.

During the direct conversation, the dialog agent apparatus may analyze the utterance history to update the requirement specification, and provide the user with the updated requirement specification.

According to an example, after the dialog agent apparatus receives the signal requesting the direct call with the service provider, the dialog agent apparatus may receive a signal requesting resumption of a dialog from the user through a dialog agent. For example, the signal requesting the resumption of the dialog may be transmitted to the dialog agent apparatus when the user speaks a predefined command keyword, for example, "dialog agent service," pushes again the button 710 of "direct conversation" displayed on the display as illustrated in FIG. 7, or types "dialog agent service." In response to the signal requesting the resumption of the dialog, the dialog agent apparatus may resume the generation of utterance information.

Figure 8A:
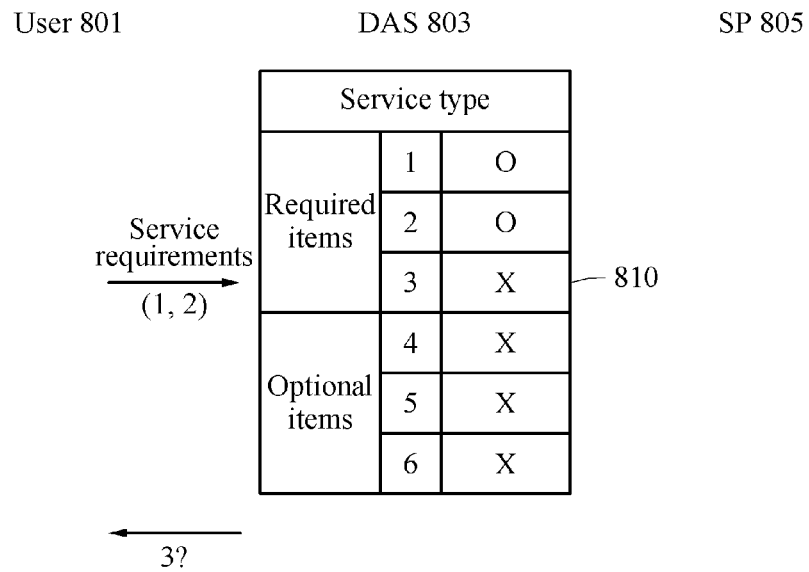
FIGS. 8A and 8B are diagrams illustrating an example of how a required item and an optional item included in a requirement specification are processed.
Figure 8B:
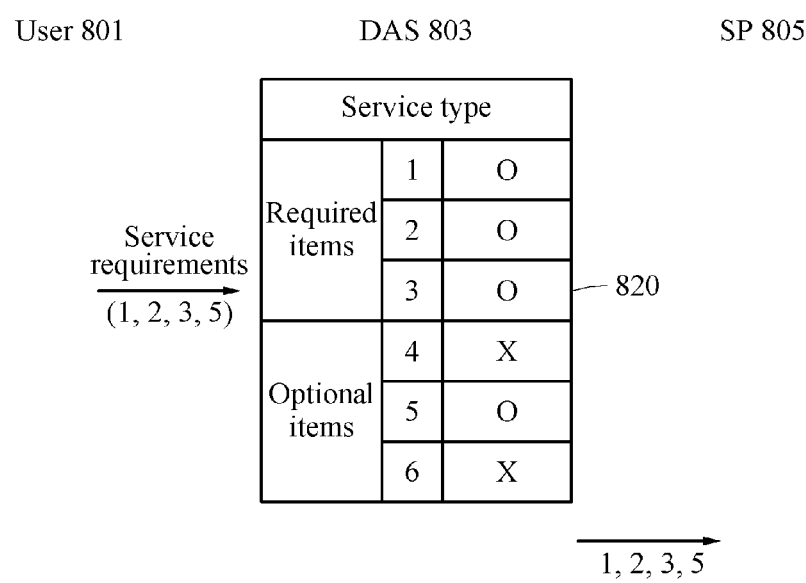

FIGS. 8A and 8B are diagrams illustrating an example of how a required item and an optional item included in a requirement specification are processed. Referring to FIG. 8A, when a user 801 transmits requirements requested for a service to a dialog agent 803 through a user device of the user 801, the dialog agent 803 may generate a requirement specification 810 based on the requirements. In the examples described herein, a dialog agent may be included in a dialog agent apparatus and the dialog agent apparatus may be included in a DAS, and thus the dialog agent 803 may be indicated as the DAS in the examples of FIGS. 8A and 8B. In the example of FIG. 8A, items included in the requirement specification 810 include at least one optional item in addition to at least one required item set by each type of service.

The dialog agent 803 may analyze the requirement and determine a type or domain of service requested by the user 801. The dialog agent 803 may retrieve a requirement specification form predefined for each type of service and fill a value in a required item in a requirement specification based on information or initial information obtained by analyzing requirements requested by the user 801. A required item and an optional item included in a requirement specification may be set for each type of service.

For example, as illustrated in FIG. 8A, when the requirements include contents corresponding to values of items 1 and 2 among required items and a value of item 3 among values of the required items is needed additionally, the dialog agent 803 may generate outgoing utterance information to query the value of item 3. The dialog agent 803 may transmit, to the user 801, the generated outgoing utterance information querying the value of item 3 and receive a corresponding response to fill all the values of the required items in the requirement specification 810. The dialog agent 803 may then generate utterance information based on the requirement specification 810 in which all the values of the required items are filled to request the service from a provider of the service, or a service provider 805 as illustrated, and output the generated utterance information. In this example, values of optional items in the requirement specification 810 may be filled through a call with the service provider 805 or left in blank.

Referring to FIG. 8B, when the user 801 transmits requirements requested for a service to the dialog agent 803 through the user device of the user 801, the dialog agent 803 may generate a requirement specification 820 based on the requirements.

For example, as illustrated in FIG. 8B, when the requirements include contents corresponding to values of items 1 through 3 of required items and a value of item 5 among optional items, the dialog agent 803 may generate the requirement specification 820 by filling the values of items 1 through 3 of the required items and the value of item 5 of the optional items based on the requirements. In this example, item 5 which is classified into one of the optional items in the requirement specification 820 may be changed to a required item based on the requirements requested by the user 801, for example, an utterance content of the user 801, or be processed the same as the required items. Thus, whether an item is a required item or an optional item may be determined or changed based on an utterance content of the user 801.

The dialog agent 803 may generate utterance information and output the generated utterance information based on the requirement specification 820 to request the service from a service provider 805.

As described above, communication between the user 801 and the dialog agent 803 may be performed through an utterance interface, and also be performed through other interfaces, for example, a graphical UI (GUI), as needed.

Figure 9:
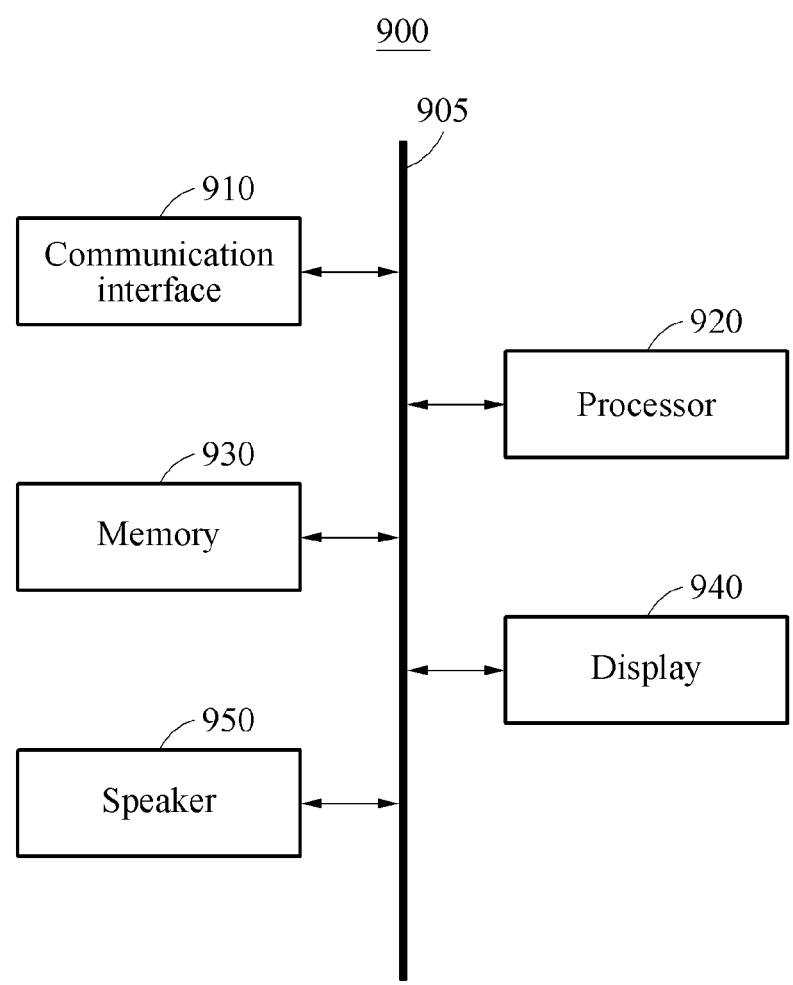
FIG. 9 is a diagram illustrating an example of a dialog agent apparatus.

FIG. 9 is a diagram illustrating an example of a dialog agent apparatus. Referring to FIG. 9, a dialog agent apparatus 900 includes a communication interface 910 and a processor 920. The dialog agent apparatus 900 may further include a memory 930, a display 940, and a speaker 950. The communication interface 910, the processor 920, the memory 930, the display 940, and the speaker 950 may be connected to one another through a communication bus 905.

The communication interface 910 may obtain an utterance history including at least one of an outgoing utterance or an incoming utterance to be transmitted or received to request a service. The communication interface 910 may output utterance information generated by the processor 920.

The communication interface 910 may receive a signal requesting resumption of a dialog through the dialog agent apparatus 900. In response to the signal requesting the resumption of the dialog, the processor 920 may resume the generation of the utterance information.

The communication interface 910 may provide a user with updated requirement specification, the utterance history, or both the updated requirement specification and the utterance history.

The communication interface 910 may receive the requirement specification generated based on information collected through an interface of a user device of the user.

The communication interface 910 may obtain at least one of a first outgoing utterance to be transmitted from the dialog agent apparatus 900 to a service provider, a first incoming utterance to be received by the dialog agent apparatus 900 from the service provider, a second outgoing utterance to be transmitted from the dialog agent apparatus 900 to the user, or a second incoming utterance to be received by the dialog agent apparatus 900 from the user.

The processor 920 may update the requirement specification including items needed to request the service based on the utterance history. The processor 920 may generate the utterance information based on the updated requirement specification to request the service. The requirement specification may include state information indicating whether requirements of the items are satisfied or not. The state information may indicate, for example, a first state indicating that a requirement of a corresponding item is satisfied, a second state indicating that a requirement of a corresponding item is not satisfied, and a third state indicating that whether a requirement of a corresponding item is satisfied or not satisfied is not yet determined.

The processor 920 may determine whether the requirements of the items are satisfied based on the utterance history, and update the requirement specification based on a result of the determining.

The processor 920 may determine whether a requirement of at least one of the items is satisfied, or determine whether a requirement of at least one of the items is not satisfied.

The processor 920 may input the utterance history and the requirement specification to a first classifier. The processor 920 may determine whether the requirement of the at least item is satisfied based on a multi-hot vector output from the first classifier. The first classifier may be configured to determine whether the requirements of the items are satisfied and output, as a multi-hot vector, state information corresponding to the items.

The processor 920 may input the utterance history and the requirement specification to a second classifier. The processor 920 may determine whether the requirement of the at least one item is not satisfied based on a multi-hot vector output from the second classifier. The second classifier may be configured to determine whether the requirements of the items are not satisfied and output, as a multi-hot vector, state information corresponding to the items.

The processor 920 may determine whether all the requirements of the items are satisfied. When all the requirements of the items are determined to be satisfied, the processor 920 may notify the user that the request for the service is completed.

The processor 920 may determine whether all the requirements are satisfied based on the updated requirement specification. The processor 920 may also determine whether all the requirements of the items are satisfied using a third classifier. The third classifier may be configured to determine whether the requirements of the items are satisfied based on the utterance history and the requirement specification and output a value, for example, a binary value, indicating whether all the requirements are satisfied.

The processor 920 may determine an utterance target based on the updated requirement specification. The processor 920 may then output the utterance information to the utterance target. The processor 920 may output the utterance information through, for example, the display 940 and/or the speaker 950.

When a requirement of at least one of items included in the updated requirement specification is not satisfied, the processor 920 may determine the user to be the utterance target. The items included in the requirement specification may include at least one required item defined for each type of service. The items may further include at least one optional item, excluding the required item.

The communication interface 910 may receive a signal requesting a direct call with the service provider from the user device.

After receiving the signal requesting the direct call, the processor 920 may suspend the generation of the utterance information, and provide the service provider with information input from the user device.

When the requirement of the at least one item included in the updated requirement specification is not satisfied, the processor 920 may query the user about the at least one item.

In addition, the processor 920 may perform at least one method described above with reference to FIG. 1 through 8B, or an algorithm corresponding to the method. The processor 920 may be a data processing device embodied by hardware having a circuit of a physical structure to perform desired operations. The desired operations may include, for example, codes or instructions included in programs. The data processing device embodied by hardware may include, for example, a microprocessor, a central processing unit (CPU), a processor core, a multi-core processor, a multiprocessor, an application-specific integrated circuit (ASIC), and a field-programmable gate array (FPGA).

The processor 920 may implement a program and control the dialog agent apparatus 900. A code of the program implemented by the processor 920 may be stored in the memory 930.

The memory 930 may store the requirement specification received from the user device. In addition, the memory 930 may also store the requirement specification updated by the processor 920. In addition, the memory 930 may also store the utterance information generated by the processor 920.

The memory 930 may store various sets of information generated during operations performed by the processor 920. In addition, the memory 930 may store various sets of data and programs. The memory 930 may include a volatile memory or a nonvolatile memory. The memory 930 may include a mass storage medium, for example, a hard disk, and store various sets of data therein.

The display 940 may output the utterance information generated by the processor 920 in a form of text. The speaker 950 may output the utterance information generated by the processor 920 in a form of voice or speech. The processor 920 may include a TTS function.

The DAS, the dialog agent apparatus, the dialog agent, and other apparatuses, units, modules, devices, and other components described herein with respect to FIGS. 1, 3, and 9 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 4, 5A-5E, and 6-8B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An operation method performed by a dialog agent, comprising:
   obtaining an utterance history corresponding to a user request for a service, the utterance history including an outgoing utterance transmitted to request the service and an incoming utterance received to request the service;
   determining a type of the user request based on the utterance history, determining a requirement specification for the user request based on the type of the user request, the requirement specification comprising items, and determining requirements for the respective items based on the utterance history;
   determining whether the requirements are satisfied based on the utterance history, and based thereon updating the requirement specification with state information indicating whether the requirements of the items are satisfied;
   generating utterance information to be used to request the service based on the updated requirement specification; and
   outputting the utterance information.

2. The operation method of claim 1, wherein the state information indicates at least one of:
   a first state indicating that a requirement of a corresponding item is satisfied,
   a second state indicating that a requirement of a corresponding item is not satisfied, or
   a third state indicating that whether a requirement of a corresponding item is satisfied or not satisfied is not yet determined.

3. The operation method of claim 1, wherein the utterance information comprises utterance content for inquiring at least one of an item for which the requirements is not satisfied, and an item for which the requirements is not yet determined.

4. The operation method of claim 1, wherein determining whether the requirements are satisfied comprises at least one of:
determining whether a requirement of at least one of the items is satisfied; or
determining whether a requirement of at least one of the items is not satisfied.

5. The operation method of claim 4, wherein determining whether the requirement of the at least one item is satisfied comprises:
inputting the utterance history and the requirement specification to a classifier, wherein the classifier is configured to determine whether the requirements of the items are satisfied and to output, as a multi-hot-vector, state information corresponding to the items; and
determining whether the requirement of the at least one item is satisfied based on the multi-hot vector.

6. The operation method of claim 1, further comprising:
determining whether all requirements of the items are satisfied; and
notifying a user that the request for the service is completed based on a determination that all the requirements are satisfied.

7. The operation method of claim 6, wherein determining whether all the requirements of the items are satisfied comprises at least one of:
determining whether all the requirements are satisfied based on the updated requirement specification; or
determining whether all the requirements are satisfied using a classifier configured to determine whether the requirements of the items are satisfied based on the utterance history and the requirement specification and to output a value indicating whether all the requirements are satisfied.

8. The operation method of claim 1, further comprising:
determining an utterance target based on the updated requirement specification,
wherein outputting the utterance information comprises:
outputting the utterance information to the utterance target.

9. The operation method of claim 8, wherein determining the utterance target comprises:
in response to a requirement of at least one of items included in the updated requirement specification not being satisfied, determining a user to be the utterance target.

10. The operation method of claim 1, wherein the items include at least one required item set for each type of service and at least one optional item.

11. The operation method of claim 1, wherein obtaining the utterance history comprises at least one of:
obtaining a first outgoing utterance to be transmitted from the dialog agent to a provider of the service;
obtaining a first incoming utterance to be received by the dialog agent from the provider of the service;
obtaining a second outgoing utterance to be transmitted from the dialog agent to a user; or
obtaining a second incoming utterance to be received by the dialog agent from the user.

12. A non-transitory computer-readable storage medium storing instructions that, when executed by a processor, cause the processor to perform the operation method of claim 1.

13. A dialog agent apparatus comprising:
a processor;
storage storing instructions configured to, when executed by the processor, cause the processor to:
obtain an utterance history corresponding to a user request for a service, the utterance history including an outgoing utterance transmitted to request a service and an incoming utterance received to request the service;
output utterance information;
determine a requirement specification for the user request based on the utterance history, the requirement specification comprising items, and determining requirements for the respective items based on the utterance history;
determine whether the requirements are satisfied based on the utterance history, and based thereon update the requirement specification with state information indicating whether the requirements of the items are satisfied; and
generate utterance information to be used to request the service based on the updated requirement specification.

14. The dialog agent apparatus of claim 13, wherein the state information indicates at least one of:
a first state indicating that a requirement of a corresponding item is satisfied,
a second state indicating that a requirement of a corresponding item is not satisfied, or
a third state indicating that whether a requirement of a corresponding item is satisfied or not satisfied is not yet determined.

15. The dialog agent apparatus of claim 13, wherein the utterance information comprises utterance content for inquiring at least one of an item for which the requirements is not satisfied, and an item for which the requirements is not yet determined.

16. The dialog agent apparatus of claim 13, wherein the processor is further configured to:
determine whether a requirement of at least one of the items is satisfied or determine whether a requirement of at least one of the items is not satisfied.

17. The dialog agent apparatus of claim 16, wherein the processor is further configured to:
Input the utterance history and the requirement specification to a classifier, wherein the classifier is configured to determine whether the requirements of the items are satisfied and to output, as a multi-hot-vector, state information corresponding to the items; and
determine whether the requirement of the at least one item is satisfied based on the multi-hot vector.

18. A method performed by a computing device, the method comprising:
executing an agent that intermediates a user request for a service based on utterances comprising user utterances, agent utterances, and service utterances, the intermediating comprising:
receiving and storing the user utterances;
transmitting, to the service, the agent utterances, wherein the agent utterances are generated based on the user utterances and the service utterances;

receiving the service utterances from the service, the service utterances provided by the service in response to the agent utterances;

based on the stored utterances:
- determining a requirement specification for the user request, the requirement specification comprising parameters of the user request;
- determining requirement values for the parameters, respectively; and
- determining satisfaction statuses of the respective parameters based further on the values; and generating one of the service utterances according to the satisfaction statuses and transmitting the service utterance to the service.

19. The method according to claim 18, wherein the determining the requirement specification, the determining the requirement values, and the determining the satisfaction statuses comprises providing the stored utterances to one or more neural networks.

20. The method of claim 19, wherein the one or more neural networks comprise one or more classifiers that classify the stored utterances.

\* \* \* \* \*